(12) United States Patent
Sun et al.

(10) Patent No.: US 7,715,627 B2
(45) Date of Patent: May 11, 2010

(54) AUTOMATIC DETERMINATION OF THE STANDARD CARDIAC VIEWS FROM VOLUMETRIC DATA ACQUISITIONS

(75) Inventors: Ying Sun, Plainsboro, NJ (US); Leo Grady, Yardley, PA (US); Gareth Funka-Lea, Cranbury, NJ (US); Thomas O'Donnell, New York, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1084 days.

(21) Appl. No.: 11/387,339

(22) Filed: Mar. 23, 2006

(65) Prior Publication Data

US 2006/0239554 A1    Oct. 26, 2006

Related U.S. Application Data

(60) Provisional application No. 60/665,160, filed on Mar. 25, 2005.

(51) Int. Cl.
*G06K 9/34* (2006.01)
*G06K 9/00* (2006.01)
*G06K 9/62* (2006.01)
*G06F 15/00* (2006.01)
*G06G 5/00* (2006.01)

(52) U.S. Cl. .................. 382/173; 382/128; 382/159; 345/581; 345/501

(58) Field of Classification Search .............. 382/128, 382/159, 173; 345/581, 501; 716/2, 5, 6, 716/7, 8, 18; 370/380
See application file for complete search history.

(56) References Cited

U.S. PATENT DOCUMENTS

| | | | |
|---|---|---|---|
| 5,107,838 A * | 4/1992 | Yamaguchi | 600/410 |
| 6,563,941 B1 * | 5/2003 | O'Donnell et al. | 382/131 |
| 6,718,063 B1 * | 4/2004 | Lennon et al. | 382/224 |
| 6,744,923 B1 * | 6/2004 | Zabih et al. | 382/226 |
| 6,772,398 B2 * | 8/2004 | Saluja et al. | 716/2 |
| 6,785,409 B1 * | 8/2004 | Suri | 382/128 |
| 7,260,252 B2 * | 8/2007 | Fujisawa | 382/131 |
| 7,513,867 B2 * | 4/2009 | Lichtenstein | 600/37 |
| 7,542,622 B1 * | 6/2009 | Angelini et al. | 382/275 |

(Continued)

FOREIGN PATENT DOCUMENTS

WO    WO 2004/003851    *   1/2004

OTHER PUBLICATIONS

Rege et al. "Co Clustering Documents and Words Using Bipartite Isoperimetric Graph Partioning" Databasea and Multimedia Group (Machine Vision and Pattern Recognition Lab) pp. 1-10.*

(Continued)

*Primary Examiner*—Bhavesh M Mehta
*Assistant Examiner*—Mia M Thomas
(74) *Attorney, Agent, or Firm*—Donald B. Paschburg

(57) ABSTRACT

A system and method for automatically determining the standard cardiac image views as defined by the American Heart Association from volumetric data of the chest including the heart. The system and method can be used by a health practitioner to quickly see the two dimensional views from which a diagnosis is generally made. The left ventricle is detected. Then the relative orientation of the right ventricle is determined and the standard cardiac views are determined.

21 Claims, 14 Drawing Sheets

U.S. PATENT DOCUMENTS

| | | | |
|---|---|---|---|
| 7,630,548 B2 * | 12/2009 | Grady | 382/173 |
| 2003/0006984 A1 * | 1/2003 | Gerard et al. | 345/424 |
| 2004/0087853 A1 * | 5/2004 | Fujisawa | 600/425 |
| 2004/0125997 A1 * | 7/2004 | Jacob et al. | 382/128 |
| 2004/0153128 A1 * | 8/2004 | Suresh et al. | 607/14 |
| 2004/0243012 A1 * | 12/2004 | Ciaccio et al. | 600/509 |
| 2005/0008209 A1 * | 1/2005 | Matsumoto | 382/128 |
| 2005/0033143 A1 * | 2/2005 | O'Donnell et al. | 600/407 |
| 2005/0113664 A1 * | 5/2005 | Stefani et al. | 600/407 |
| 2005/0113665 A1 * | 5/2005 | Mohr et al. | 600/407 |
| 2005/0238215 A1 * | 10/2005 | Jolly et al. | 382/128 |
| 2005/0281447 A1 * | 12/2005 | Moreau-Gobard et al. | 382/130 |
| 2006/0034513 A1 * | 2/2006 | Cai et al. | 382/173 |
| 2006/0045328 A1 * | 3/2006 | Jacob et al. | 382/154 |
| 2006/0062457 A1 * | 3/2006 | Grady | 382/173 |
| 2006/0104510 A1 * | 5/2006 | Aharon et al. | 382/173 |
| 2006/0116575 A1 * | 6/2006 | Willis | 600/434 |
| 2006/0182341 A1 * | 8/2006 | Rinck et al. | 382/173 |
| 2008/0181479 A1 * | 7/2008 | Yang et al. | 382/131 |
| 2008/0249414 A1 * | 10/2008 | Yang et al. | 600/445 |
| 2008/0253638 A1 * | 10/2008 | Binkley et al. | 382/131 |
| 2008/0304744 A1 * | 12/2008 | Peters et al. | 382/173 |
| 2009/0028403 A1 * | 1/2009 | Bar-Aviv et al. | 382/128 |
| 2009/0232371 A1 * | 9/2009 | Jolly | 382/128 |
| 2009/0316964 A1 * | 12/2009 | Mahesh et al. | 382/128 |

OTHER PUBLICATIONS

Grady et al. "Isoperimetric Graph Partitioning for Image Segmentation" IEEE Transactions on Pattern Analysis and Machine Intel vol. 28, No. 3, Mar. 2006 pp. 1-7.*

Grady "Fast, Quality, Segmentation of Large Volumes" Siemens Corporate Research pp. 1-15.*

Lelieveldt, et al, Automated Observer-Independent Acquisition of Cardiac Short-Axis MR Images: A Pilot Study, Radiology, 2001.

Grady, Leo, et al., "Isoperimetric Graph Partitioning for Data Clustering and Image Segmentation", Available at http://www.math.ucdavis.edu/~saito/data/high-dimensions/grady2003isoperimetric-TR.pdf, last accessed on Nov. 8, 2005,(Jul. 29, 2003),1-39.

Grady, Leo J., "Space-Variant Computer Vision: A Graph-Theoretic Approach.", Submitted in partial fulfillment of the requirements for the degree of Doctor of Philosophy; Boston University, Graduate School of Arts and Sciences.,(2004),1-159.

Grady, Leo, "Fast, Quality, Segmentation of Large Volumes—Isoperimetric Distance Trees," available at http://cns-web.bu.edu/~lgrady/#reports, last accessed on Mar. 21, 2006.

Cerqueira M D et al: "Standardized Myocardial Segmentation and Nomenclature for Tomographic Imaging of the Heart a Statement of Healthcare Professionals From the Cardiac Imaging Committee of the Council on Clinical Cardiology of the American Heart Association" Circulation, American Heart Association, Dallas, TX, US, vol. 105, No. 4, Jan. 29, 2002, pp. 539-542, XP001164153 ISSN: 0009-7322 cited in the application section "Name for Cardiac Planes".

WO 2004/107273 A (Siemens Corporate Research, Inc) Dec. 9, 2004 cited in the application abstract p. 4, line 1-p. 11, line 2 figures 7,8,10.

Jackson Clare et al: "Automatic planning of the acquisition of cardiac MR images" Lecture Notes in Computer Science, Springer Verlag, New York, NY, US, vol. 2879, no. Part 1, 2003, pp. 541-548, XP002356819 ISSN: 0302-9743 cited in the application abstract section 2.

Grady L., Sun Y., Williams J.: "Three Interactive Graph-Based Segmentation Methods Applied to Cardiovascular Imaging" Handbook of Mathematical Models in Computer Vision (Ed. Paragios N. ,Chen Y., Faugeras 0.), Dec. 15, 2005, pp. 453-469, XP002391252 sections 3.8 and 3.9 figures 3,4.

A Grady L et al: "Isoperimetric Graph Partitioning for Data Clustering and Image Segmentati on" Technical Report CAS/CNS-TR-03-015, Department of Cognitive and Neural Systems, Boston University, Boston, MA, Jul. 29, 2003, XP002378771 sections 2 and 3.

* cited by examiner

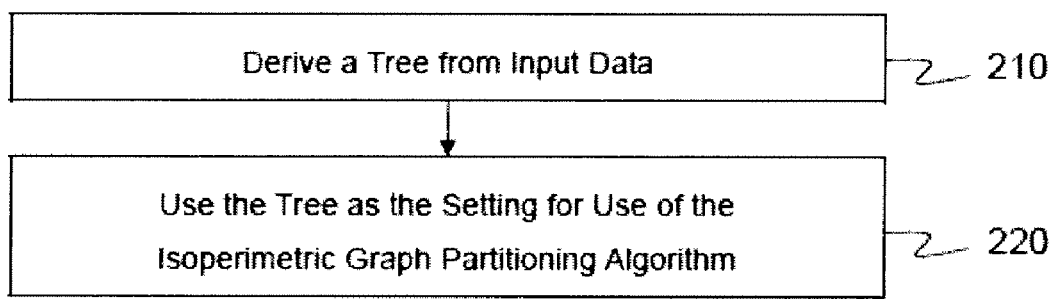

FIG. 10

```
┌─────────────────────────────────────────────────┐
│           Derive a Tree from Input Data         │──── 210
└─────────────────────────────────────────────────┘
                        │
                        ▼
┌─────────────────────────────────────────────────┐
│      Use the Tree as the Setting for Use of the │──── 220
│      Isoperimetric Graph Partitioning Algorithm │
└─────────────────────────────────────────────────┘
```

FIG. 11

AUTOMATIC DETERMINATION OF THE STANDARD CARDIAC VIEWS FROM VOLUMETRIC DATA ACQUISITIONS

CROSS-REFERENCE TO RELATED APPLICATIONS

This application claims the benefit of U.S. Provisional Application No. 60/665,160, filed Mar. 25, 2005, which is incorporated herein by reference.

BACKGROUND OF THE INVENTION

The present invention relates to processing systems and methods for automatically determining predefined viewing directions of a heart from medical imaging data.

The standard views for the display of cardiac-related imagery are defined by the American Heart Association. These views include the short axis view, the vertical long axis view, and the horizontal long axis view. With reference to FIG. 1, the standard views may be defined in relation to the left ventricle 12 and right ventricle 14 of a heart 10, and include a short axis view (SA), a vertical long axis view (VLA) and a horizontal long axis view (HLA). For orientation reference FIG. 2 provides a schematic view of the heart and FIG. 3 provides a view of an image slice with right and left ventricles.

The short axis view is orthogonal to the long axis of the left ventricle, with the long axis going through the center of the image. The short axis cuts the long axis in the middle of the axis, and so the image is approximately centered on the center of the left ventricle. The viewing direction is from the cardiac apex towards the base of the left ventricle, with the top-side of the image pointing towards the anterior of the patient.

The vertical long axis view (VLA) is orthogonal to both the short axis view and the horizontal long axis view. For VLA views, the long axis of the left ventricle is parallel with the row vector of the, and goes through the center of the image (i.e. the long axis is a horizontal line dividing the image plane into upper and lower halves). The center of the image is aligned with the middle of the long axis of the left ventricle, with the viewing direction from right to left, and the top-side of the image pointing towards the anterior of the patient.

The horizontal long axis view (HLA) is orthogonal to both the short axis view and the vertical long axis view. For HLA views, the long axis of the left ventricle is parallel with the column vector of the image, and goes through the center of the image (i.e. the long axis is a vertical line dividing the image plane into left and right halves). The center of the image is aligned with the middle of the long axis of the left ventricle, with the viewing direction basically from the posterior to the anterior of the patient.

Much of the prior work has focused on scan planning for magnetic resonance imaging (MRI). Most cardiac MRI studies are two-dimensional (2D) in nature. Several 2D scout images are acquired to visualize the thorax and heart anatomy, and then a set of parallel 2D scans is done oriented with the short-axis of the heart. One or two long axis 2D images may also be scanned. Automating the process of planning this type of cardiac MRI study has been investigated. Lelieveldt et al., in an article entitled "Automated observer-independent acquisition of cardiac short-axis MR images: a pilot study", in Radiology, 221(2), pages 537-542 (2001), automate planning for only the short-axis view. The work of Jackson et al., disclosed in an article entitled "Automatic Planning of the Acquisition of Cardiac MR Images", in MICCAI, September 2003, pages 541-548, includes automatic planning of the long-axis views. Lelieveldt et al. use a template matching scheme for the entire thorax using fuzzy implicit surfaces on 2D images aligned with the axes of the scanner. The template includes a definition of the likely cardiac short-axis orientation. This is computationally expensive and assumes a fixed field of view. Jackson et al. use an Expectation-Maximization (EM) algorithm to segment the chambers of the heart in a stack of 2D scans that are taken at an orientation found to be a good approximation to the short axis in fifty adult patients. EM algorithms are also computationally expensive. A line is then fit through the centroids found for the left ventricle in each 2D image to determine the left ventricle long-axis. The HLA is defined at an orientation through the left ventricle long axis and the average of the points on the right ventricle farthest from the left ventricle.

In U.S. patent application Ser. No. 10/852,834 by T. O'Donnell and B. Cowan, filed May 25, 2004, and entitled "Automatic Optimal View Determination for Cardiac Acquisitions," incorporated herein by reference, sampling the heart and chest in axial, sagittal, and coronal images and then using a pre-existing segmentation algorithm (such as the segmentation algorithm disclosed by M. P. Jolly in "Combining edge, region, and shape information to segment the left ventricle in cardiac MR images," MICCAI, September 2001, pages 482-490) to find the borders of the left ventricle is disclosed. An ellipsoid is fit to these borders, and the long-axis of the ellipse is taken as a first approximation to the long-axis of the left ventricle. The direction of the HLA is determined as an orientation through the left ventricle long axis and the direction of the right ventricle relative to the left ventricle. The VLA is defined as being orthogonal to the SA and the HLA. These estimates can be refined by evaluating scans taken oriented with the estimated SA, HLA, VLA.

Despite the availability of these algorithms, it is nevertheless desirable to provide yet more accurate means of automatically estimating the SA, HLA, and VLA views from volumetric data.

SUMMARY OF THE INVENTION

The present invention provides methods and a system to accurately estimate standard cardiac image views as defined by the American Heart Association from a 3D volume provide by one of several possible imaging techniques. It is one aspect of the present invention to provide methods for automatic segmentation of the Left Ventricle in a 3D image of the heart and based on the LV segmentation to estimate the SA, LHA and VLA for standard cardiac image views.

In accordance with one aspect of the present invention the Left Ventricle of the heart is detected automatically in a 3D image.

In accordance with a further aspect of the present invention detection of the LV takes place on a downsampled volume.

In accordance with another aspect of the present invention a point inside the left ventricle is identified, which will be used as the seed point for complete left ventricle detection.

In accordance with a further aspect of the present invention a threshold is set to isolate the blood pool in the left ventricle from neighboring structures. An error check is included to prevent the threshold from being set too high.

In accordance with another aspect of the present invention the detection method creates a masked volume of the LV by applying iteratively the isoperimetric tree algorithm to reduce the size of a masked volume from its connected pieces until the algorithm attempts to break the Left Ventricle in half.

In accordance with a further aspect of the present invention methods are provided that will determine the viewing axes for standard SA, LHA and VLA cardiac views based on the downsampled volume and the LV mask.

DESCRIPTION OF THE DRAWINGS

FIG. 10 illustrates a Gaussian elimination of the Laplacian matrix of a tree with ordering given by the numbers inside the nodes.

FIG. 11 is a flowchart showing a method of graph partitioning

DESCRIPTION OF A PREFERRED EMBODIMENT

In the following, volumetric data, as obtained from known medical-imaging equipment, is worked upon to present to a user a visually useful image corresponding to the volumetric data. The volumetric data may be obtained, for example, from whole heart magnetic resonance angiography (MRA). It will be appreciated that volumetric data obtained by other means may also be utilized. That is, the present invention is not limited to specific types of volumetric data, file formats, voxel or pixel resolutions, or the like. The volumetric data may be thought of as describing a plurality of specific locations in space, each with a corresponding intensity value. Of course, the volumetric data may contain additional information, but such additional information is not required for the purposes of the following disclosure.

The present invention method may be implemented in the form of a computer program executable on any suitable computing device, such as a personal computer, as known in the art. The program may be coded using any suitable programming language. Providing a program that implements the present invention algorithm should be routine for one of reasonable skill in the art, after having the benefit of the following disclosure.

Figure 4:
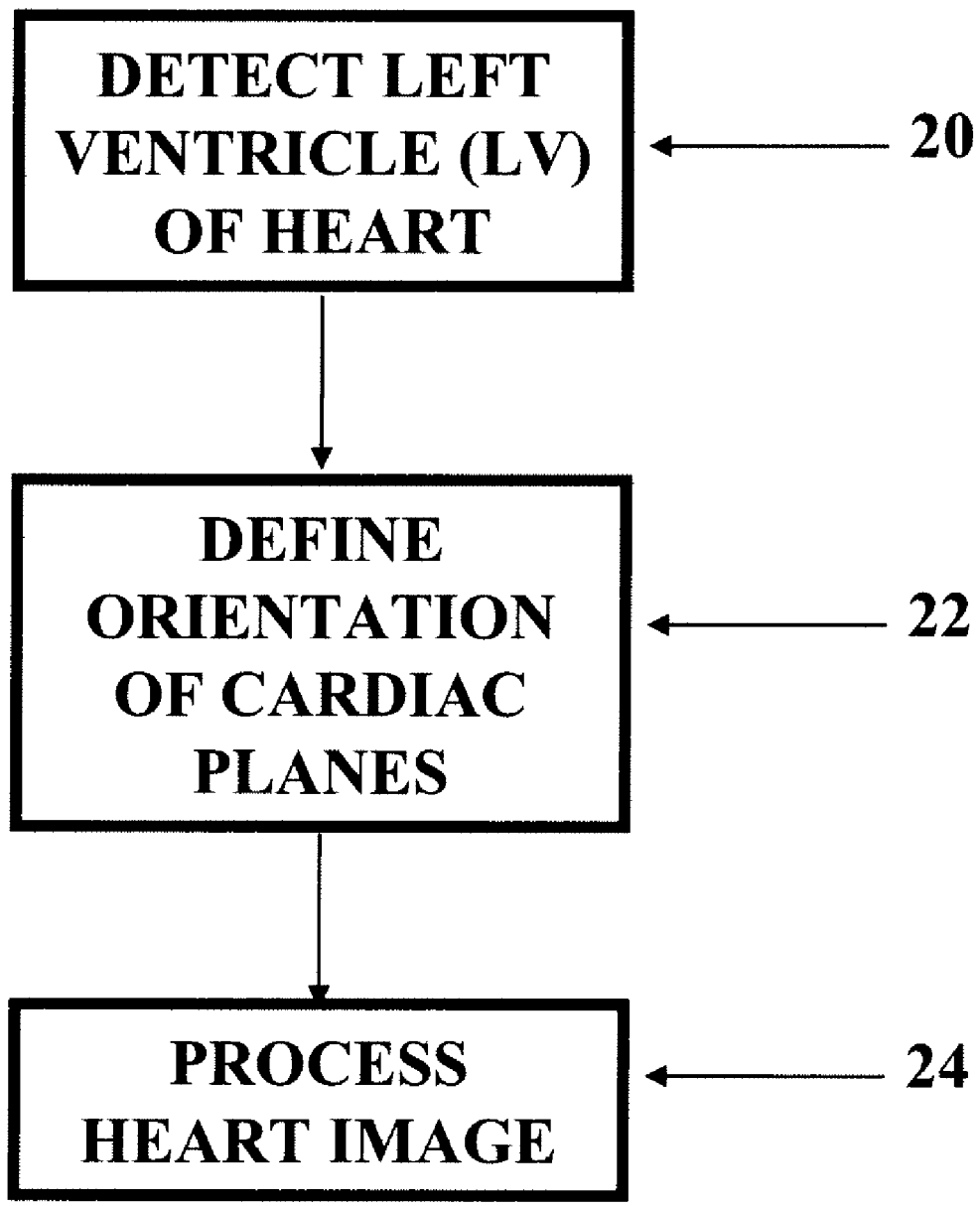
FIG. 4 shows a process in accordance with one aspect of the present invention.

The present invention provides automatic determination of the standards cardiac views from volumetric data by approaching the analysis in three dimensions (3D), unlike the prior art methods that perform the analysis in 2D. This 3D approach is enabled, in part, by an efficient means to segment the chambers of the heart in 3D, as disclosed in U.S. patent application Ser. No. 11/230,598 by L. Grady, filed Sep. 20, 2005, entitled "Isoperimetric trees for image segmentation," and incorporated herein by reference. This method derives a tree from input data and using the tree as the setting for isoperimetric graph partitioning. The method includes obtaining a mask, and may include computing a distance map on the mask; obtaining a foreground point and computing a maximal spanning tree. A matrix representing the maximal spanning tree can be used to solve a system of linear equations to define a family of segmentations. A preferred segmentation can be selected from the family of segmentations by using the isoperimetric ratio as the metric of selecting the preferred segmentation. Given the availability of efficient 3D segmentation methods for the left ventricle, a more accurate means of estimating the SA, HLA, and VLA views is possible, as described below. High level steps for using the the present invention are shown in the flow diagram of FIG. 4.

The approach for automatically finding the standard cardiac views, in accordance with one aspect of the present invention, may be broken into two major parts:

1. Automatically detecting the left ventricle of the heart (step 20 in FIG. 4), and
2. Given the left ventricle of the heart, defining the orientation of the cardiac planes based on the long axis of the left ventricle and the direction of the right ventricle relative to the left ventricle (step 22 in FIG. 4).

Once steps 20 and 22 have been performed, the heart image can be processed in step 24.

1. Left Ventricle Detection

Detecting the left ventricle is difficult both because of the variety of left ventricle shapes, sizes and positions between patients and, due to open valves, the lack of a direct intensity cue to delineate the left ventricle from the left atrium or the aorta. Additionally, the point in the heart cycle from which volumetric data is drawn cannot be anticipated, nor can the amount of noise in the volumetric data be predicted.

Figure 5:
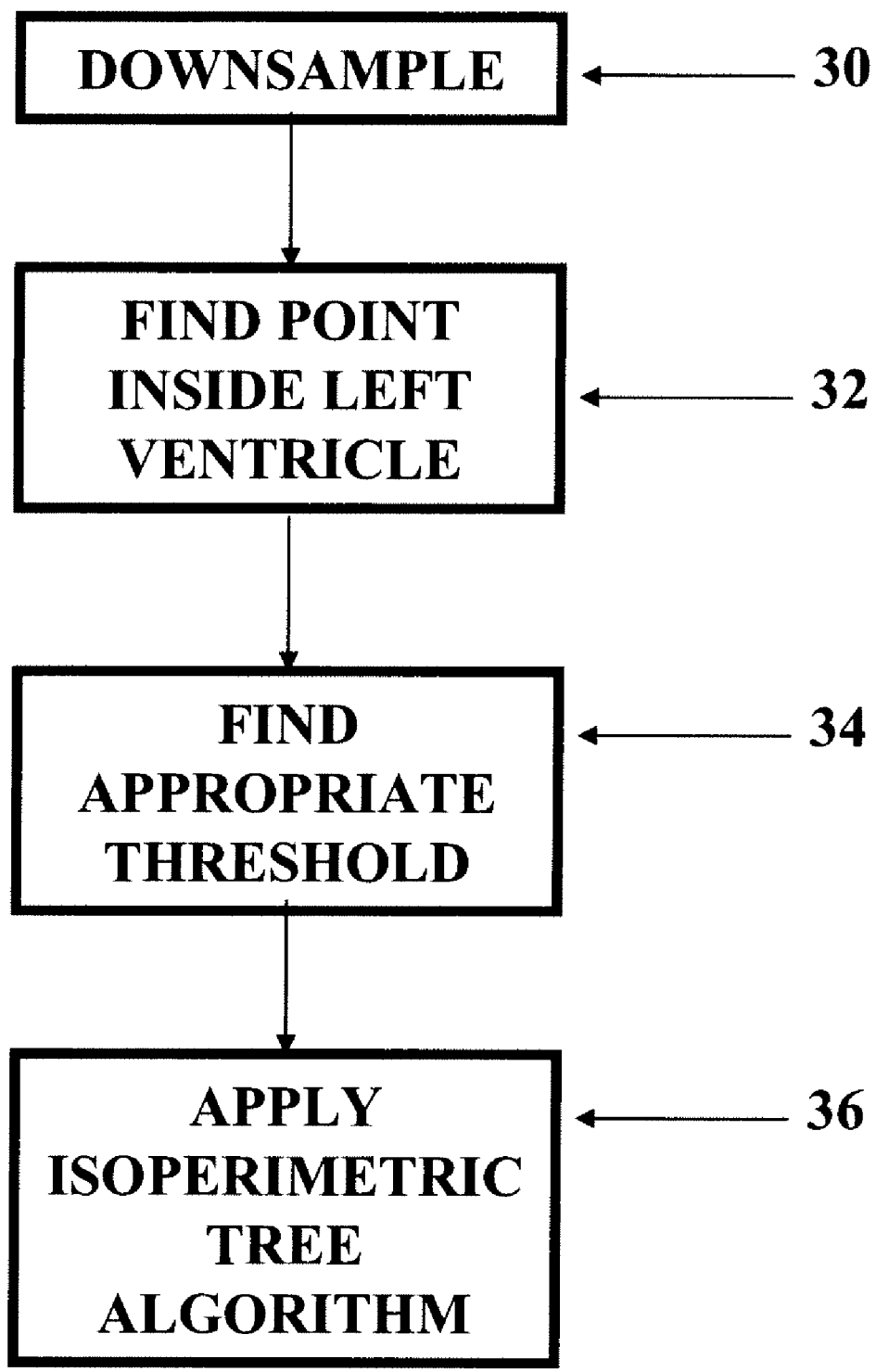
FIG. 5 illustrates a process in accordance with another aspect of the present invention.

The method developed to handle this task is given in the following steps illustrated in FIG. 5:

A. Downsampling to a smaller volume (step 30);
B. Finding a point inside the left ventricle (step 32);
C. Finding an appropriate threshold for the left ventricle (step 34); and
D. Iteratively applying an isoperimetric tree algorithm, breaking off connected pieces (e.g., aorta, chambers) of the masked volume until the algorithm attempts to break the left ventricle in half (step 36).

The following provides additional detail about each of the above steps.

A. Downsampling

The volumetric data can be relatively large; that is, the volumetric data may have a relatively high resolution, such as 512×512×K. The original 512×512×K volumetric data may be downsampled without filtering (i.e. via injection) to provide downsampled data with a resolution of 128×128×W4. This downsampling may be done purely for speed, but is not required. In the event that downsampling is not performed, the original volumetric data may be used instead in the subsequent steps.

B. Finding a Point Inside the Left Ventricle

Standard left ventricle detection algorithms, that will find a point inside the left ventricle in an image are available. For instance a left ventricle detection algorithm from the Argus application may be used to find a point inside the left ventricle by checking a subset of slices in the downsampled data for annular objects. The Argus detection algorithm only works on 2D images, where the cross section of the left ventricle is roughly circular. If the orientation is reversed (for instance according to the DICOM header in the volumetric data), slices on the opposite side of the volume are checked instead.

C. Thresholding

The goal in setting a threshold is to isolate the blood pool inside the left ventricle while leaving natural "bottlenecks" in the anatomy that could be used to differentiate the left ventricle from neighboring structures (e.g., the aorta or left atrium). Intensities from training datasets generally group naturally into five modes, and it may be determined empirically that setting a threshold at the minimal point between the fourth and fifth mode meets the thresholding goal stated above. Therefore, the thresholding algorithm may set a conservative threshold somewhere on the fourth mode and look for the best "bottleneck" (relative to the histogram of the image) obtained from raising the threshold. An error check may be included such that a threshold that is set too high (as determined by having too few voxels in the left ventricle mask is lowered until a minimum number of voxels are contained within the mask. After thresholding, "holes" within the left ventricle mask may be filled, where a hole is defined to be any below-threshold voxel that has no connected path of below-threshold voxels to the outside border of the volume.

D. Isoperimetric Trees

Isoperimetric trees may be employed based on the morphology of the left ventricle mask and within mask contrast in order to both identify "bottlenecks" (to differentiate the left ventricle from from neighboring structures like aorta and left atrium) in the anatomy and to quantify the "bottleneckness" of a given partition. The notion of "bottleneckness" is given by the (combinatorial) isoperimetric ratio, which may be used as a measure of the segmentation quality. In the context of the present invention this means that the ratio of the segmented partition to the boundary with its surroundings is minimal. See for instance L. Grady, "Space-variant computer vision: a graph-theoretic approach," PhD dissertation, Boston University, 2004, which is hereby incorporated by reference. See, also, U.S. patent application Ser. No. 11/273,511 filed Nov. 14, 2005, which is hereby incorporated by reference.

An isoperimetric tree algorithm may be applied iteratively to the downsampled data in order to identify the best breakpoint in the left ventricle mask, and to determine if the "best" breakpoint is a "good" breakpoint (as quantified by the isoperimetric ratio). If the breakpoint is considered good enough, those points may be removed from the left ventricle mask, and iteration of the isoperimetric tree algorithm may be continued. The iterations of the isoperimetric tree algorithm stop when the best breakpoint remaining in the left ventricle mask is to divide the left ventricle (detected by the poor isoperimetric ratio of this partition); the left ventricle mask is then returned. As to isoperimetric trees, reference is made to U.S. patent application Ser. No. 11/230,598, filed Sep. 20, 2005 and to U.S. Provisional Patent Application No. 60/612, 105, filed Sep. 22, 2004, both of which are hereby incorporated by reference. See, also, "Fast, Quality, Segmentation of Large Volumes—Isoperimetric Distance Trees," by Leo Grady, available at http:cns-web.bu.edu/~lgrady/#reports, which is hereby incorporated by reference.

2. Orientation Determination

After the LV has been accurately detected it is possible to determine the viewing axes and the viewing planes in accordance with a further aspect of the present invention. The invention method takes the down-sampled volume data and the left ventricle mask as inputs. The long axis of the left ventricle determines the plane of the short axis view. The orientation of the right ventricle relative to the long axis of the left ventricle determines the plane of the horizontal long axis view. The vertical long axis view is defined as orthogonal to the short axis and horizontal long axis views. The coordinate system, as indicated by the DICOM header, is used to determine the correct viewing orientation for the three views.

Figure 1:
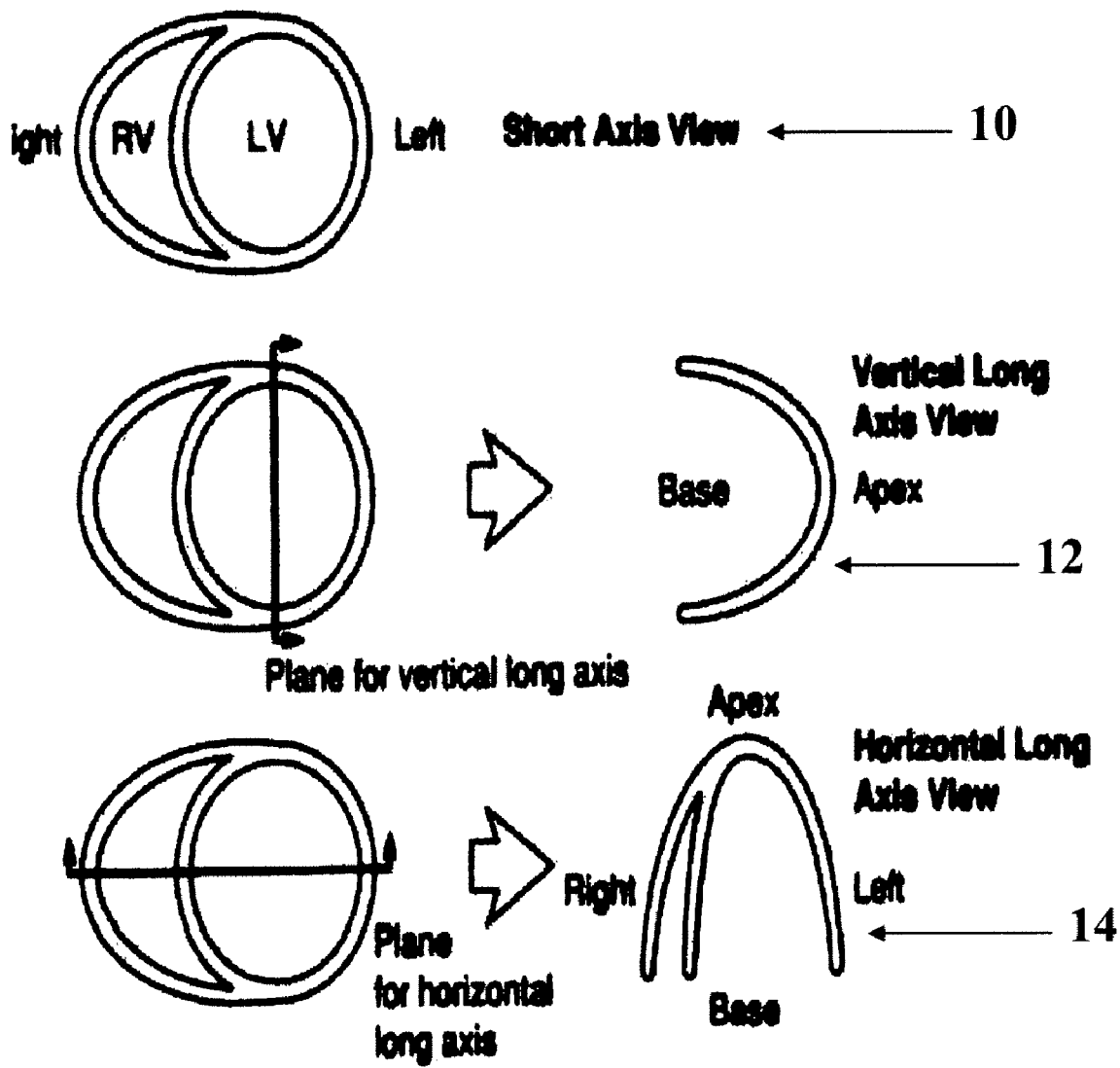
FIG. 1 illustrates standard cardiac views.
Figure 2:
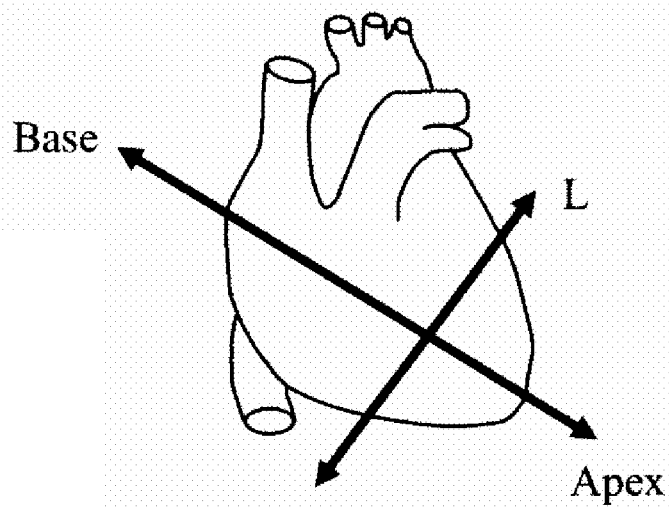
FIG. 2 illustrates the orientation of the axes.
Figure 3:
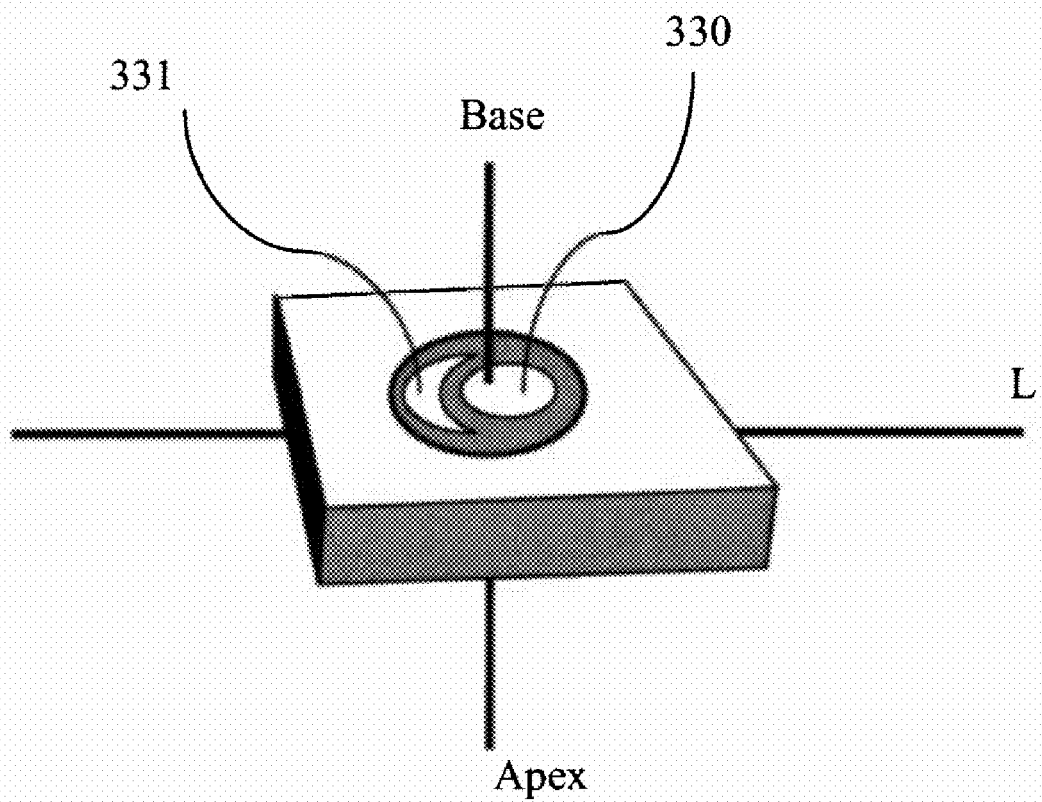
FIG. 3 is a diagram of an image slice.
Figure 6:
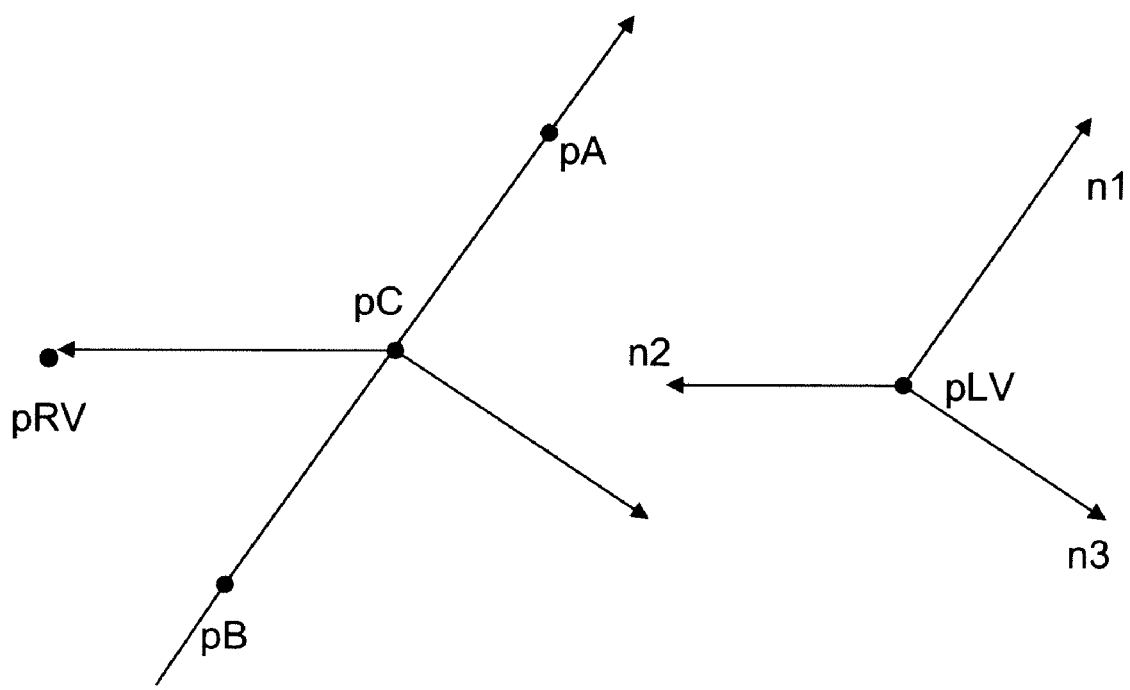
FIG. 6 illustrates the determination of the cardiac planes in accordance with a further aspect of the present invention.

With reference to FIG. 2 the heart is shown in diagram to show the long axis from Base to Apex. FIG. 2 also shows the short axis, which is perpendicular to the long axis. FIG. 3 is a diagram of an image slice showing right and left ventricle in along the short axis perpendicular to the long axis with 331 the right ventricle and 330 the left ventricle. With reference to FIG. 6, the apex of the left ventricle may be defined as pA. The base of the left ventricle may be defined as pB. The center of the right ventricle may be defined as pRV. First, the center of the left ventricle pLV is found, and a rough estimation of the centers of the apex portion and the base portion of the left ventricle are obtained. Then, a point in the right ventricle is found, and the first approximation of the heart orientation is obtained.

Next, the estimation of the apex center pA is refined using the short-axis views obtained by reformatting the volume according to the current approximation of the heart orientation. Similarly, the estimation of the base center pB is refined. Finally the center of the right ventricle pRV is identified.

Given the three points, pA, pB, and pRV, the long axis, indicated by arrow n1, is determined by pA and pB; the axis pointing from the left ventricle to the right ventricle, indicated by arrow n2, is determined by pRV and pC, where pC is on the long axis n1 and pRV-pC is perpendicular to the long axis n1; the third axis, indicated by arrow n3, is then the cross product of n1 and n2. The three standard cardiac planes are defined by n1, n2, n3, and pLV.

Once the cardiac planes have been determined, the medical image data can be processed and manipulated in accordance with known techniques to view a heart and connected pieces in the medical image data; Accordingly, the present invention contemplates processing medical image data using the left ventricle location and the cardiac orientations.

Figure 7:
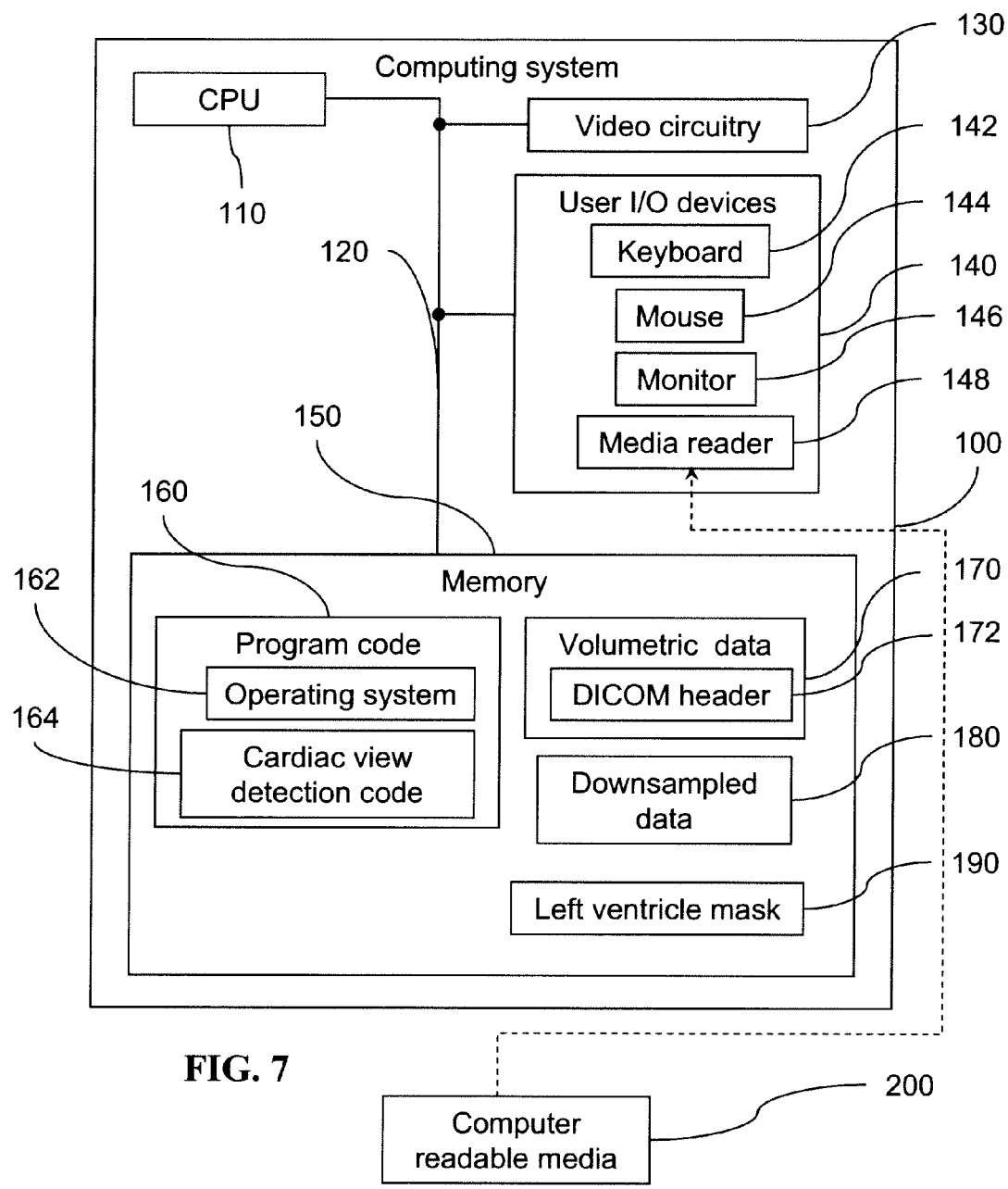
FIG. 7 is a diagram of a computer system that can be used to implement the processes of the present invention in accordance with further aspects of the present invention.

With reference to FIG. 7, the present invention algorithm may be performed by a computing system 100. As known in the art of computational graphics, the computing system 100 typically includes a central processing unit (CPU) 110 in electrical communications via a bus 120 with video circuitry 130, user input/output (I/O) devices 140, and memory 150. The user I/O devices 140 may include a keyboard 142, a mouse 144, a monitor 146 and a media reader 148. The CPU 110 is capable of receiving user input from the keyboard 142, the mouse 144 and the media reader 148, and controls the graphical output presented by the monitor 146 by controlling the video circuitry 130. The video circuitry 130 is in communications with the monitor 146, typically via a direct electrical connection, and provides video signals suitable to drive the monitor 146. The monitor 146 may be a liquid crystal display (LCD), a cathode ray tube (CRT), a plasma display or the like. The media reader 148 is a device capable of reading information from any suitable computer-readable media 200, and may be a CD drive, a DVD drive, a floppy disk drive, a flash memory port, etc. The memory 150 may include working memory for the CPU 110, such as static or dynamic random access memory (SRAM, DRAM), or their equivalents, and, by way of paging, may also include storage memory, such as from a hard disk.

The memory 150 holds information that may be worked upon by the CPU 110. In particular, the memory 150 includes program code 160 that is executable by the CPU 110, and which controls the operations of the CPU 110. For purposes of the following disclosure, when it is said that the CPU 110 performs a particular function or task, it should be understood that it is the program code 160 that directs the CPU 110 to perform that function or task. The program code 160 may include an operating system 162, such as the Windows® operating system, and also includes cardiac view detection code 164, which implements the present invention method. Coding of the cardiac view detection code 164 should be routine for one of ordinary skill in the art after having the benefit of the following disclosure.

The cardiac view detection code 164 may be installed into the memory 150 of the computer system 100 from a computer-readable media 200, such as a CD, DVD, floppy disk, flash memory card, etc. This computer-readable media 200 holds the cardiac view detection code 164, optionally in a compressed, segmented or otherwise encoded form. When inserted into the media reader 148, an installation process, such as by an installation procedure provided by the operating system 162, as known in the art, installs or loads the cardiac view detection code 164 into the memory 150. The cardiac view detection code 164 may then subsequently be executed by the CPU 110.

Any type of computer system can be used to in accordance with present invention. For example, the computer system can be a personal computer, a laptop, a workstation, a multiprocessor computer system, or any other type of computer system.

Figure 8:
FIGS. 8 and 9 illustrate images resulting from the implementation of the present invention.
Figure 9:
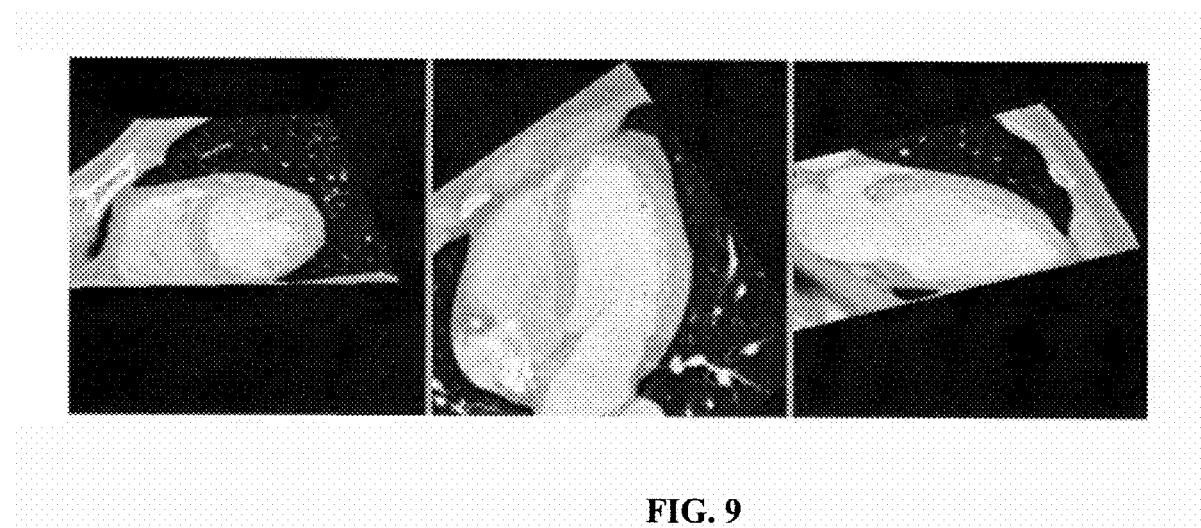

FIGS. 8 and 9 illustrate results obtained in accordance with the processes of the present invention. Now referring to FIG. 8, an illustrative example of three views generated using the present invention from CT data of the heart in SA, HLA and VLA view is shown. FIG. 9 shows as an illustrative example of three views generated using the present invention from CT data of the heart in SA, HLA and VLA view.

The method for image segmentation by isoperimetric distance trees is described in detail next.

Formally, a graph is a pair G=(V, E) with nodes or vertices v∈V and edges e∈E⊆V×V. An edge, e, spanning two vertices $v_i$ and $v_j$, is denoted by $e_{ij}$. A weighted graph has a value (assumed to be nonnegative and real) assigned to each edge called a weight. The weight of edge $e_{ij}$ is denoted by $w(e_{ij})$ or $w_{ij}$ and represents the strength or affinity between neighboring voxels.

Isoperimetric Graph Partioning

The isoperimetric algorithm for graph partitioning can be developed by writing the isoperimetric ratio as $$h_G(x) = \min_x \frac{x^T L x}{x^T r},$$  [Equation 1]

where r is the vector of all ones, and x represents a vector indicating node membership in a set S⊆V, i.e., $$x_i \begin{cases} 0 & \text{if } v_i \in S \\ 1 & \text{if } v_i \in \bar{S}. \end{cases}$$  [Equation 2]

The n×n matrix L is the Laplacian matrix of the graph, defined as $$L_{v_i v_j} \begin{cases} d_i & \text{if } i = j \\ -w(e_{ij}) & \text{if } e_{ij} \in E \\ 0 & \text{otherwise,} \end{cases}$$  [Equation 3]

where $d_i$ denotes the weighted degree of vertex $v_i$ $$d_i = \Sigma w(e_{ij}) \forall e_{ij} \in E.$$  [Equation 4]

The notation $L_{v_i v_j}$ is used to indicated that the matrix L is indexed by vertices $v_i$ and $v_j$.

With these definitions, the numerator of the ratio in Equation 1 represents the sum of the weights of the edges spanning S and $\bar{S}$, while the denominator gives the cardinality of S. By relaxing the binary definition of x and minimizing the numerator of Equation 1 with respect to x, given the cardinality constraint $|V|-x^T r=k$, one is left with a singular system of equations. The singularity may be overcome by arbitrarily assigning one node, $v_g$, to S, resulting in the nonsingular system $$L_0 x_0 = r_0,$$  [Equation 5]

where the subscript indicates that the row corresponding to $v_g$ has been removed (or the row and column, in the case of $L_0$.

Given a real-valued solution to Equation 5, one can convert this solution into a partition by finding the threshold that produces a partitioning with minimal isoperimetric constant, with requires trying only n thresholds. In the present context, we are interested in the geometry of the graph (mask), and, therefore, in the solution of Equation 5, we treat $w_{ij}=1$.

Trees

In accordance with exemplary embodiments of the present invention, the standard lattice edge set is replaced with a tree. A zero-fill Gaussian elimination ordering means that the system of linear equations may be solved in two passes, with storage equal to n. Specifically, the ordering may be found in linear time by eliminating the nodes with (unweighted) degree of one (i.e., leaf nodes in the tree) and recursively eliminating nodes which subsequently have degree one until a root node is reached. In this case, a convenient root node is the ground. A method of producing a no-fill ordering of a tree, according to exemplary embodiments of the present invention, is presented below.

Method of Producing a No-Fill Ordering of a Tree

```
1:  void compute_ordering(degree, tree, ground, ordering)
2:      k ⇐ 0
3:      degree[root] ⇐ 0 {Fixed so that ground is not eliminated}
4:      ordering[N-1] ⇐ ground
5:      for each node in the graph do
6:          while degree[current_node] equals 1 do
7:              ordering[k] ⇐ current_node
8:              degree[current_node] ⇐ degree[current_node]-1
9:              current_node ⇐ tree[current_node]
10:             degree[current_node] ⇐ degree[current_node]-1
11:             k ⇐ k + 1
12:         end while
13:         k ⇐ k + 1
14:     end for
```

The above-described method of producing a no-fill order of a tree accomplishes the ordering in linear time, where the array "tree" contains, for each node, the index of one neighbor (with no edges overrepresented). This representation is possible because a tree has n−1 edges (where the root would contain a '0').

FIG. 10 illustrates a Gaussian elimination of the Laplacian matrix of a tree with ordering given by the numbers inside the nodes, according to an exemplary embodiment of the present invention. Referring to FIG. 10, the top row depicts elimination of the tree, and the bottom row depicts the Laplacian matrix of the tree after each elimination step.

Distance Trees

As described above, by using a tree as the underlying graph structure, i.e., instead of the lattice, a linear-time solution of Equation 5 can be obtained.

A method of solving Equation 5, according to exemplary embodiments of the present invention, is presented below.

Method of Solving Equation 5

```
1:  solve_system(ordering, diagonal, tree, r, output)
2:  {Forward pass}
3:  k ← 0
4:  for each node in the graph do
5:      r[tree[ordering[k]]] ← r[tree[ordering[k]]/diagonal[ordering[k]]
6:      k ← k + 1
7:  end for
8:
9:  output[ordering[N–1]] ← r[ordering[N–1]]/diagonal[N–1]]
10:
11: {Backward pass}
12: k ← N–2 {Last non-ground node}
13: for each non-ground node do
14:     output[ordering[k]] ← output[tree[ordering[k]]]+
                              r[ordering[k]]/diagonal[ordering[k]]
15:     k ← k + 1
16: end for
```

The most important property of a tree, such that the solution will examine the desired cut is: The path within the tree between the foreground point and the remaining voxels in the foreground object do not pass through any voxels in the background, i.e., the foreground is connected with the tree. If this condition is satisfied, and the background is also connected within the tree, then the foreground and background are connected with a single edge (i.e., since there can be no loops in a tree).

If the foreground object is connected, gradient ascent on the distance map from each node stabilizes at a node in the same set and the distance map for all neighboring nodes that stabilize to different peaks is largest on the tree foreground/background boundary, then we may construct a tree that satisfies the above desiderata. Assign to each edge in the lattice the weight $$w_{ij}=D(v_i)+D(v_j),$$ [Equation 6]

where $D(v_i)$ denotes the distance map at node $v_i$, and then compute the maximal spanning tree. Hereinafter, the maximal spanning tree of the image with weights given by Equation 6 will be referred to as a "distance tree". It should be understood that functions other than distance are suitable for implementing the present invention. Functions that are suitable for implementing the present invention include, but are not limited to, grayscale, gradient and distance.

FIG. 11 is a flowchart showing a method of graph partitioning. Referring to FIG. 11, in a step 210, a tree is derived from input data. Preferably the tree is a distance tree. For the purposes of this disclosure, "distance tree" refers to the maximal spanning tree of an image with weights given by Equation 6. Alternatively, the tree is a function tree, wherein the function is a function of interest, the function of interest defining what is important in the data.

In a step 220, the tree is used as the setting for use of the isoperimetric graph partitioning algorithm. The step of using the tree as the setting for use of the isoperimetric graph partitioning algorithm comprises: producing a no-fill ordering of a matrix, the matrix representing the tree; solving a system of linear equations with respect to the matrix, obtaining a solution; using the solution to define a family of segmentations; and selecting a segmentation from the family of segmentations based on a metric of segment quality.

In the method of graph partitioning, according to embodiments of the present invention, the input data comprises either pixels (in the case of a 2D image) or voxels (in the case of a 3D image), and a segmentation is specified by associating the pixels or voxels with either one of a foreground or a background. For example, pixels or voxels with a solution value less than or equal to a threshold are associated with the foreground and pixels or voxels with a solution value greater than the threshold are associated with the background. There are n–1 thresholds, n being the number of pixels.

In the method of graph partitioning, according to at least one embodiment of the present invention, user interaction is not required. Preferably, the metric of segment quality is an isoperimetric ratio, the isoperimetric ratio being defined as the ratio of the perimeter of a node set to the volume of the node set. The volume of the node set is computed based on at least one of the sum of weighted degrees of the nodes in the set or the number of nodes in the set.

Figure 12:
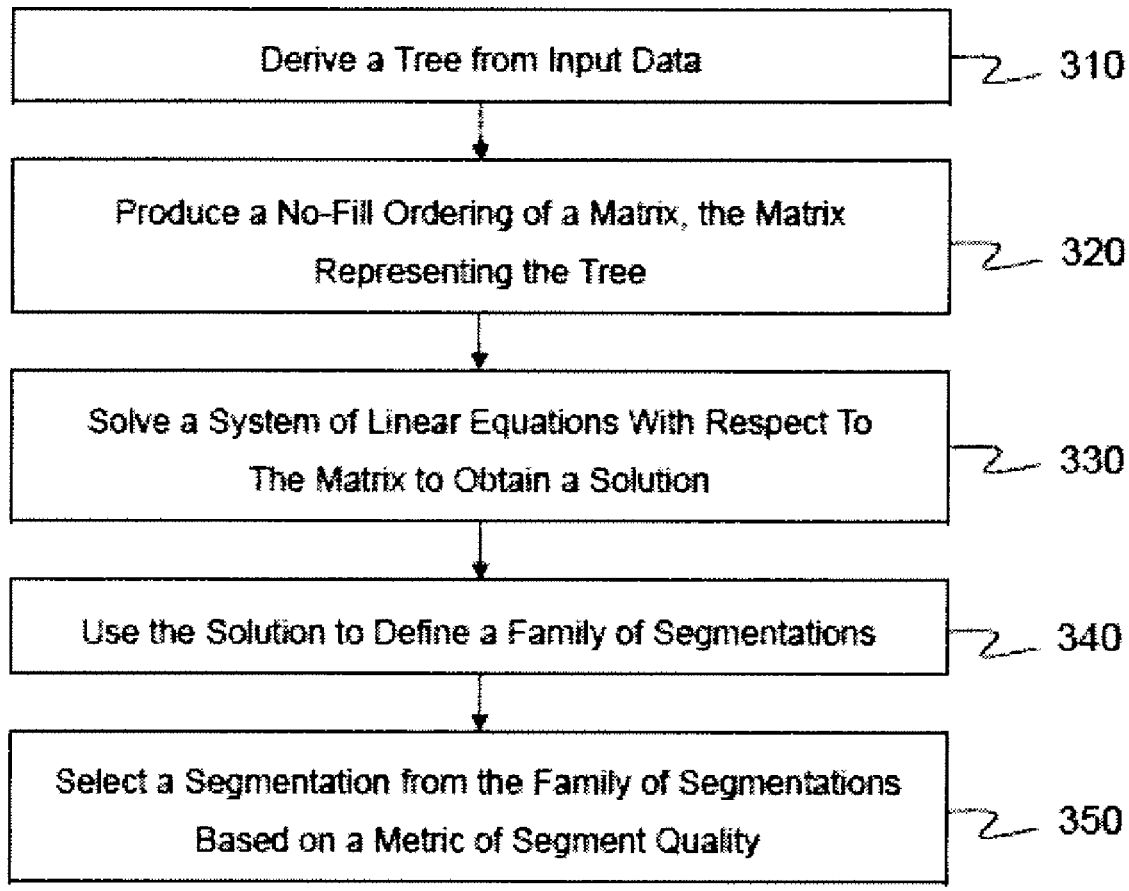
FIG. 12 is a flowchart showing a method of image segmentation

FIG. 12 is a flowchart showing a method of image segmentation, according to an exemplary embodiment of the present invention. Referring to FIG. 12, in a step 310, a tree is derived from input data. Preferably, the tree is a distance tree. Alternatively, the tree is a function tree. The function is a function of interest, the function of interest defining what is important in an image. Functions of interest include, but are not limited to, grayscale, gradient and/or distance. The input data comprises either pixels (in the case of a 2D image) or voxels (in the case of a 3D image). In one embodiment of the present invention, the input data is a mask of pre-selected voxels (e.g., from a thresholding). In one embodiment of the present invention, the step of deriving a tree from input data comprises: obtaining a mask from the input data; computing a distance map on the mask; and computing a distance tree.

In a step 320, a no-fill ordering of a matrix is produced, wherein the matrix represents the tree. In a step 330, a system of linear equations is solved with respect to the matrix, whereby a solution is obtained.

In a step 340, the solution is used to define a family of segmentations. A segmentation is specified by associating the pixels or voxels with either one of a foreground or a background. For example, pixels or voxels with a solution value less than or equal to a threshold are associated with the foreground and pixels or voxels with a solution value greater than the threshold are associated with the background. In general, there are n–1 thresholds, n being the number of pixels.

According to an embodiment of the present invention, in a step 350, a segmentation is selected form the family of segmentations based on a metric of segment quality. Preferably, the metric of segment quality is an isoperimetric ratio, the isoperimetric ratio being defined as the ratio of the perimeter of a node set to the volume of the node set. The volume of the node set is computed based on at least one of the sum of weighted degrees of the nodes in the set or the number of nodes in the set.

A method of image segmentation, according to embodiments of the present invention, further comprises obtaining a foreground point, wherein obtaining a foreground point comprises either one of automatically obtaining a foreground point or interactively obtaining a foreground point. In the method of image segmentation, according to at least one embodiment of the present invention, user interaction is not required.

Figure 13:
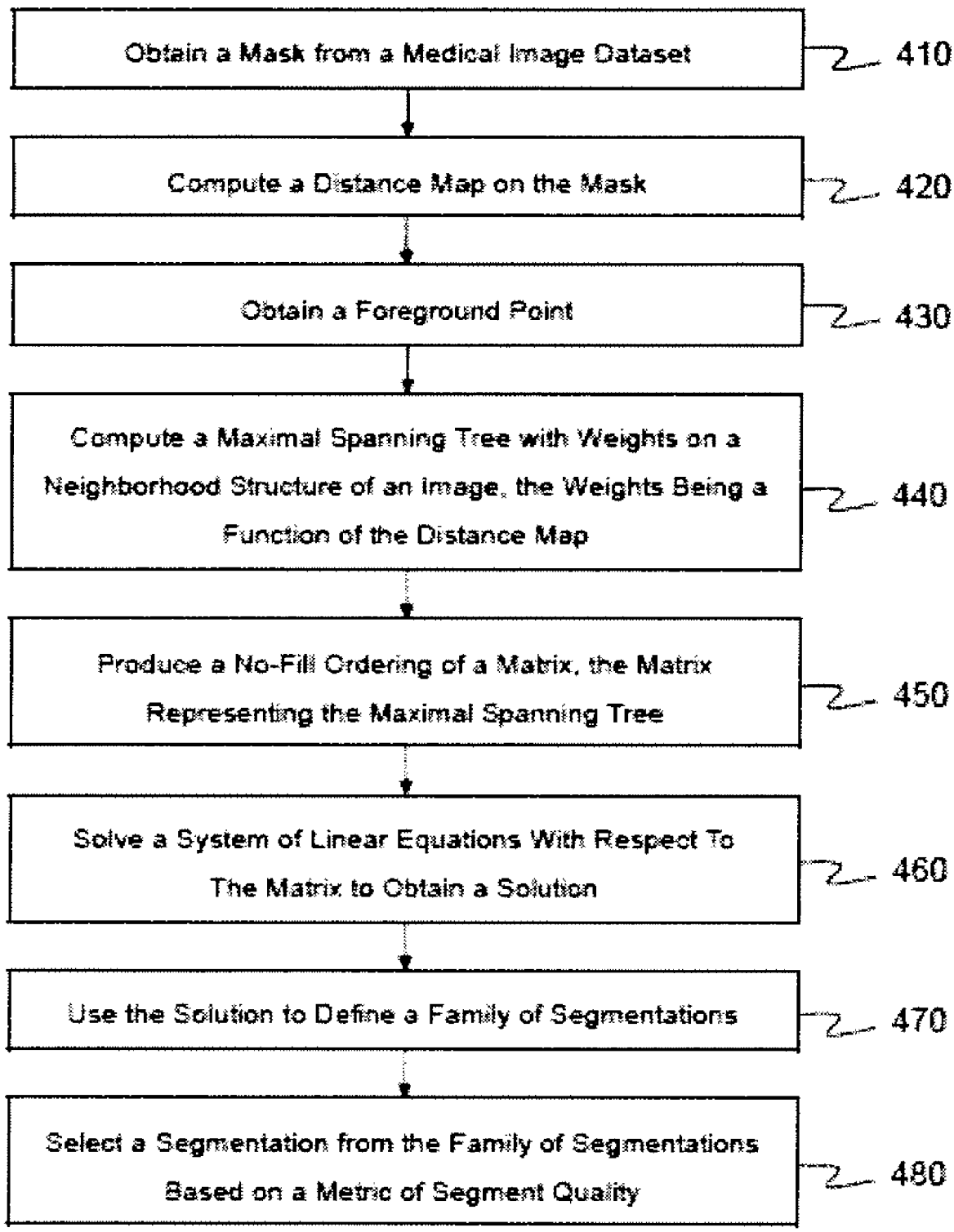
FIG. 13 is a flowchart showing a method of medical image segmentation.

FIG. 13 is a flowchart showing a method of medical image segmentation, according to an exemplary embodiment of the present invention. Referring to FIG. 13, in a step 410, a mask is obtained from a medical image dataset. The medical image dataset comprises at least one of 3D medical datasets, 2D medical datasets, or higher-dimensional medical datasets.

In a step 420, a distance map is computed on the mask. In a step 430, a foreground point is obtained. Preferably, the foreground point is a problem-specific foreground point. In one embodiment of the present invention, obtaining the problem-specific foreground point comprises obtaining a user-specified foreground point. In the method of medical image segmentation, according to at least one embodiment of the present invention, user interaction is not required.

In a step 440, a maximal spanning tree with weights is computed on a neighborhood structure of an image, the weights being a function of the distance map. The function of the distance map is given by Equation 6. In at least one embodiment of the present invention, the neighborhood structure is a lattice. The image comprises either pixels (in the case of a 2D image) or voxels (in the case of a 3D image).

In a step 450, a no-fill ordering of a matrix is produced, the matrix representing the maximal spanning tree. In a step 460, a system of linear equations is solved with respect to the matrix, obtaining a solution.

In a step 470, the solution is used to define a family of segmentations. A segmentation is specified by associating the pixels or voxels with either one of a foreground or a background. For example, pixels or voxels with a solution value less than or equal to a threshold are associated with the foreground and pixels or voxels with a solution value greater than the threshold are associated with the background. In general, there are n–1 thresholds, n being the number of pixels.

In a step 480, a segmentation is selected from the family of segmentations based on a metric of segment quality. Preferably, the metric of segment quality is an isoperimetric ratio, the isoperimetric ratio being defined as the ratio of the perimeter of a node set to the volume of the node set. The volume of the node set is computed based on at least one of the sum of weighted degrees of the nodes in the set or the number of nodes in the set.

Preferably, the tree in the method here described is a distance tree. Alternatively, the tree is a function tree. The function is a function of interest, the function of interest defining what is important in an image. Functions of interest include, but are not limited to, grayscale, gradient and/or distance. The input data comprises either pixels (in the case of a 2D image) or voxels (in the case of a 3D image). In one embodiment of the segmentation method, the input data is a mask of pre-selected voxels (e.g., from a thresholding). The step of deriving a tree from input data comprises: obtaining a mask from the input data; computing a distance map on the mask; and computing a distance tree.

The metric of segment quality is an isoperimetric ratio, the isoperimetric ratio being defined as the ratio of the perimeter of a node set to the volume of the node set. The volume of the node set is computed based on at least one of the sum of weighted degrees of the nodes in the set or the number of nodes in the set.

An isoperimetric algorithm is described in U.S. patent application Ser. No. 11/273,511, filed Nov. 14, 2005, which is hereby incorporated by reference. The isoperimetric algorithm will now be described in detail in the following section.

Figure 14:
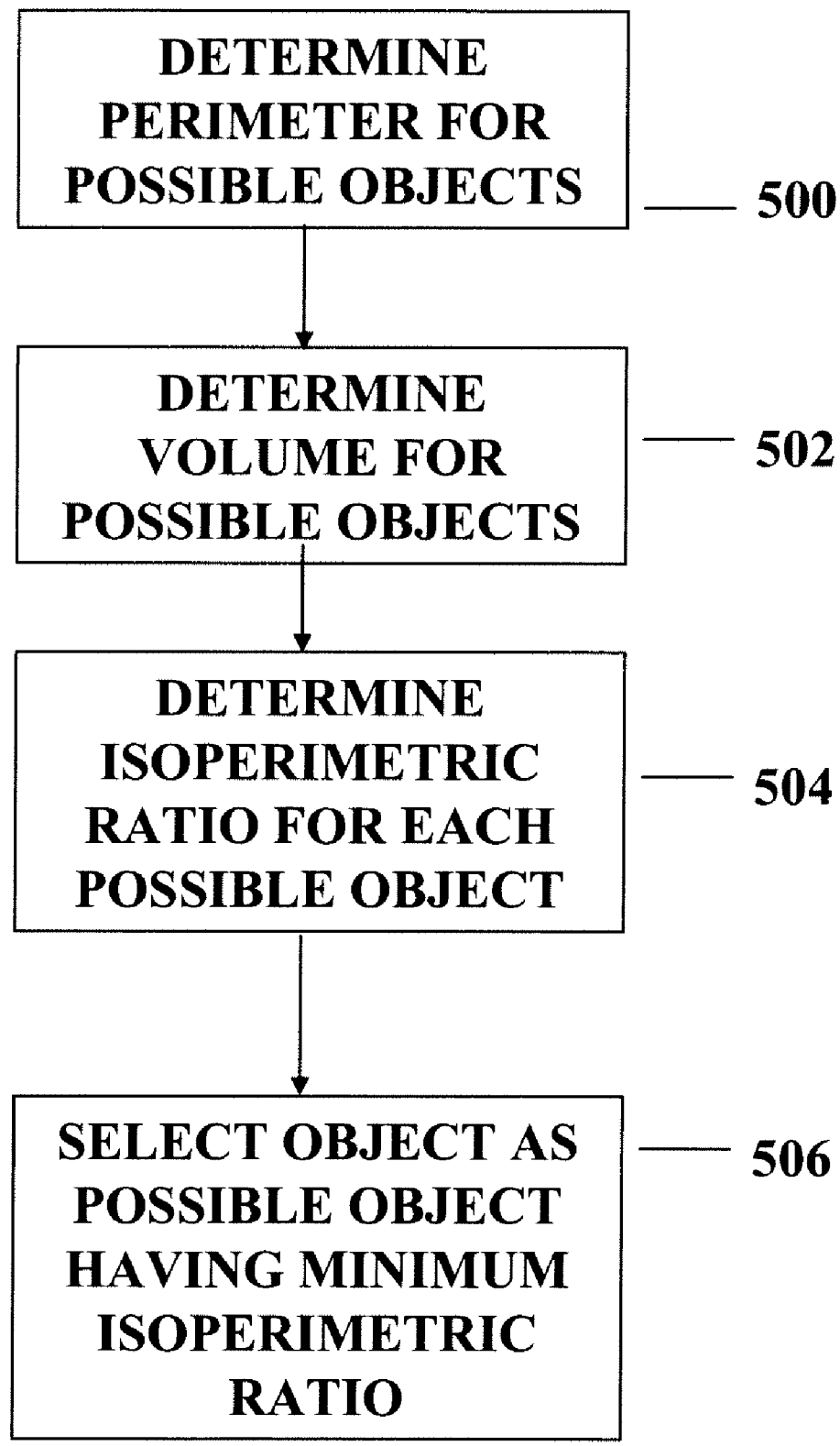
FIG. 14 illustrates steps of a process for isoperimetric segmentation.
Figure 15:
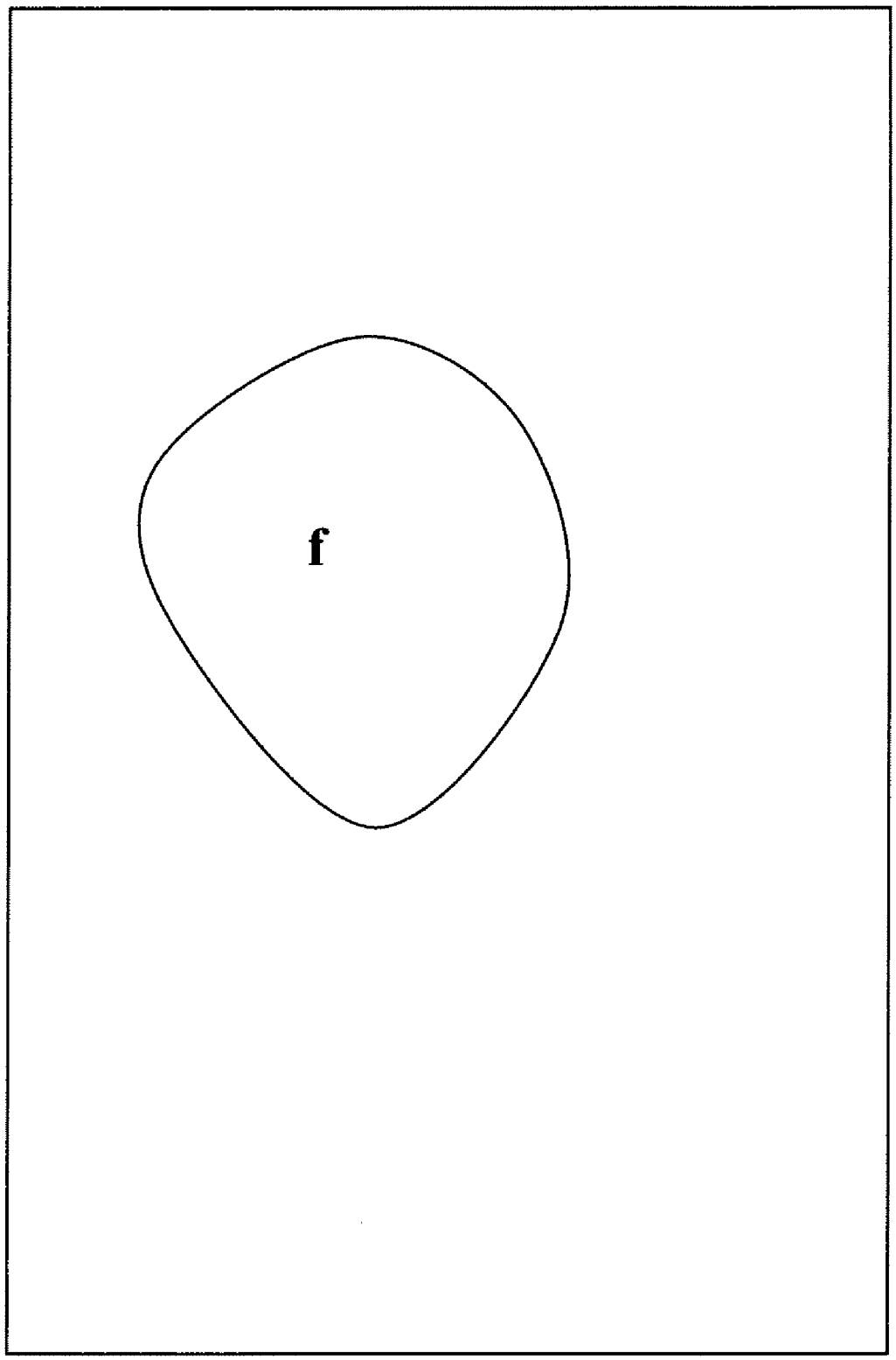
FIG. 15 illustrates an object in an image that is to be segmented.

FIG. 14 illustrates one aspect of the isoperimetric problem. In step 500, the perimeter for all possible objects identified by the marked pixel or pixels f (FIG. 15) is determined. Then, in step 502, the volume for those objects is determined. The isoperimetric ration, the perimeter divided by the volume of each possible object is determined in step 504. Then, in step 506, the object 12 is selected as being the object having the minimum isoperimetric ratio.

The main computational hurdle in the isoperimetric algorithm is the solution of a large, sparse, symmetric, positive definite, system of equations. Fortunately, the sparsity pattern of the matrix is highly structured such that the row corresponding to any one node in the lattice only contains one non-zero for each of its neighboring nodes. Consequently, one need not store the matrix explicitly, only the values of the non-zeros. The solution to the system of equations is converted into a segmentation by finding a threshold on the solution (by checking the N thresholds corresponding to each pixel) that corresponds to a partition with the smallest isoperimetric ratio, as described below.

This approach is now discussed in detail. A graph is a pair $G=(V, E)$ with vertices (nodes) $v \in V$ and edges $e \in E \subseteq V \times V$. An edge, e, spanning two vertices, $v_i$ and $v_j$, is denoted by $e_{ij}$. Let $n=|V|$ and $m=|E|$ where $|\cdot|$ denotes cardinality. A weighted graph has a value (typically nonnegative and real) assigned to each edge called a weight. The weight of edge is denoted by $w(e_{ij})$ or $w_{ij}$. Since weighted graphs are more general than unweighted graphs (i.e., $w(e_{ij})=1$ for all $e_{ij} \in E$ in the unweighted case), we will develop all our results for weighted graphs. The degree of a vertex $v_i$, denoted $d_i$, is $$d_i = \sum_{e_{ij}} w(e_{ij}) \forall\ e_{ij} \in E.$$

The vector d is a vector with one value per pixel, the value being the sum of the weights of the neighbors of that pixel.

For a graph, G, the isoperimetric constant, $h_G$ is:

$$h_G = \inf_S \frac{|\partial S|}{Vol_S} \qquad \text{Eq. [2a]}$$

where $S \subset V$ and $Vol_S \leq \frac{1}{2} Vol_V$. In graphs with a finite node set, the infimum in Eq. [2a] is a minimum. Since the present context is that of finite graphs, we will henceforth use the minimum in place of the infimum. The boundary of a set, S, is defined as $$\partial S = e_{ij}\ |\ v_i \in S, v_j \in \bar{S}, \text{ and} \qquad \text{Eq. [3a]}$$

$$|\partial S| = \sum_{e_{ij} \in \partial S} w(e_{ij})$$

In order to determine a notion of volume for a graph, a metric must be defined. Different choices of a metric lead to different definitions of volume and even different definitions of a combinatorial Laplacian operator. It has been suggested to use two different notions $$Vol_S = |S| \qquad \text{Eq. [4a]}$$

and $$Vol_S = \sum_i d_i \forall\ v_i \in S \qquad \text{Eq. [5a]}$$

One may view the difference between the definition of volume in Eq. [4a] and that in Eq. [5a] as the difference between what has been termed "Average Cut" versus the "Normalized Cut", although the isoperimetric ratio (with either definition of volume) corresponds to neither criterion. Traditional spectral partitioning employs the same algorithm as Ncuts, except that it uses the combinatorial Laplacian defined by the metric associated with Eq. [4a]. It has been found that that the second metric (and hence, volume definition) is more suited to image segmentation since regions of uniform intensity are given preference over regions that simply possess a large number of pixels. Therefore, we will use Dodziuk's second metric definition and employ volume as defined in A. E. Lefohn, J. M. Kniss, C. D. Hansen, R. T. Whitaker, "Interactive Deformation and Visualization of Level Set Surfaces Using Graphics Hardware," IEEE Visualization, pp. 7582, 2003.

For a given set, S, we term the ratio of its boundary to its volume the isoperimetric ratio, denoted by h(S). The isoperimetric sets for a graph, G, are any sets S and for which $h(S)=h_G$ (note that the isoperimetric sets may not be unique for a given graph). The specification of a set satisfying the volume constraint, together with its complement may be considered as a partition and therefore the term is used interchangeably with the specification of a set satisfying the volume constraint. A good partition is considered to be one with a low isoperimetric ratio (i.e., the optimal partition is represented by the isoperimetric sets themselves). Therefore, the goal is to maximize $Vol_S$ while minimizing $\partial S$. Unfortunately, finding isoperimetric sets is an NP-hard problem. The process may be considered to be a heuristic for finding a set with a low isoperimetric ratio that runs in low-order polynomial time.

The isoperimetric algorithm in accordance with a preferred embodiment of the present invention is now described. Define an indicator vector, x, that takes a binary value at each node $$x_i = \begin{cases} 0 & \text{if } v_i \in \overline{S} \\ 1 & \text{if } v_i \in S \end{cases}$$

Note that a specification of x may be considered a partition.

Define the n×n matrix, L, of a graph as $$L_{v_i v_j} = \begin{cases} d_i & \text{if } i = j \\ -w(e_{ij}) & \text{if } e_{ij} \in E \\ 0 & \text{otherwise} \end{cases}$$

The notation is used to indicate that the matrix L is being indexed by vertices vi, and vj. This matrix is also known as the admittance matrix in the context of circuit theory or the Laplacian matrix in the context of finite difference methods (and in the context of [9]). By definition of L, $$|\partial S| = x^T L x \qquad \text{Eq. [8a]}$$

and $Vol_S = x^T d$, where d is the vector of node degrees. If r indicates the vector of all ones, minimizing Eq. 8a subject to the constraint that the set, S, has fixed volume may be accomplished by asserting $$Vol_S = x^T d = k \qquad \text{Eq. [9a]}$$

where $0 < k < \frac{1}{2} r^T d$ is an arbitrary constant and r represents the vector of all ones. We shall see that the choice of k becomes irrelevant to the final formulation. Thus, the isoperimetric constant (Eq. [2a]) of a graph, G, may be rewritten in terms of the indicator vector as $$h_G = \min_x (x^T L x) / x^T d \qquad \text{Eq. [10a]}$$

subject to the constraint of Eq. [9a]. Given an indicator vector, x, h(x) represents the isoperimetric ratio associated with the partition specified by x. Note that the ratio given by Eq. [10a] is different from both the "ratio cut" and the "average cut" of other techniques. Although the criterion in Eq. [10a] rewards qualitatively similar partitions to the normalized cut, average cut and ratio cut (i.e., large segments with small boundaries), what appears as a minor difference in the formulation allows us to use a solution to a system of linear equations instead of solving an eigenvector problem. The advantages of solving a system of linear equations, rather than an eigenvector problem, will be discussed below.

The constrained optimization of the isoperimetric ratio is made into a free variation via the introduction of a Lagrange multiplier Λ and relaxation of the binary definition of x to take nonnegative real values by minimizing the cost function $$Q(x) = x^T L x - \Lambda(x^T d - k). \qquad \text{Eq. [11a]}$$

Since L is positive semi-definite and $x^T d$ is nonnegative, Q(x) will be at a minimum for any critical point. Differentiating Q(x) with respect to x and setting to a minimum yields $$2Lx = \Lambda d \qquad \text{Eq. [12a]}$$

Thus, the problem of finding the x that minimizes Q(x) (minimal partition) reduces to solving a linear system. Henceforth, the scalar multiplier 2 and the scalar Λ are dropped, since only the relative values of the solution are significant.

Unfortunately, the matrix L is singular: all rows and columns sum to zero (i.e., the vector r spans its nullspace), so finding a unique solution to Eq [12a] requires an additional constraint.

Assume that the graph is connected, since the optimal partitions are clearly each connected component if the graph is disconnected (i.e., h(x)=0). Note that in general, a graph with c connected components will correspond to a matrix L with rank (n−c). If a selected node, Vg, is defined to include in S (i.e., fix $x_g=0$), this is reflected in Eq. [12a] by removing the gth row and column of L, denoted by $L_0$, and the gth row of x and d, denoted by $x_0$ and $d_0$, such that $$L_0 x_0 = d_0 \qquad \text{Eq. [13a]}$$

which is a nonsingular system of equations.

Solving Eq. [13a] for $x_0$ yields a real-valued solution that may be converted into a partition by setting a threshold. It has been shown that the partition containing the node corresponding to the removed row and column of L must be connected, for any chosen threshold i.e., the nodes corresponding to $x_0$ values less than the chosen threshold form a connected component.

There is a physical analogy to this system and process. Equation [12a] occurs in circuit theory when solving for the electrical potentials of an ungrounded circuit in the presence of current sources. After grounding a node in the circuit (i.e., fixing its potential to zero), determination of the remaining potentials requires a solution of Eq. [13a]. Therefore, we refer to the node, $v_g$, for which we set $X_g=0$ as the ground node. Likewise, the solution, x, obtained from Eq[13a] at node v, will be referred to as the potential for node v. The need for fixing $X_g=0$ to constrain Eq[12a] may be seen not only from the necessity of grounding a circuit powered only by current sources in order to find unique potentials, but also from the need to provide a boundary condition in order to find a solution to Poisson's equation, of which Eq. [12a] is a combinatorial analog. In the present case, the "boundary condition" is that the grounded node is fixed to zero. With this interpretation of the notation used above, the three fundamental equations of circuit theory (Kirchhoff's current and voltage laws and Ohm's law) may be written for a grounded circuit as

| | | |
|---|---|---|
| $A_0^T y = f$ | (Kirchhoff's Current Law) | Eq. [14a] |
| $Cp = y$ | (Ohm's Law) | Eq. [15a] |
| $p = A_0 x$ | (Kirchhoff's Voltage Law) | Eq. [16a] | for a vector of branch currents, y, current sources, f, and potential drops (voltages), p. Note that there are no voltage sources present in this formulation. These three equations may be combined into the linear system $$A_0^T CA_0 x = L_0 x = f \qquad \text{Eq.[17a]}$$

since $A^T CA = L$.

There is a deep connection between electric circuits and random walks on graphs, which suggests the analysis of this algorithm in terms of a random walk on a graph. The electric potential calculated above for each node admits interpretation as the expected number of steps a random walker starting from that node would take in order to reach the ground, if his probability of walking from node $v_i$ to $v_j$ is equal to $w_{ij}/d_i$. In this interpretation, the threshold is in units of expected steps of a random walker to ground, chosen to partition the graph into subsets possessing the smallest isoperimetric ratio for justification of this interpretation).

Figure 16:
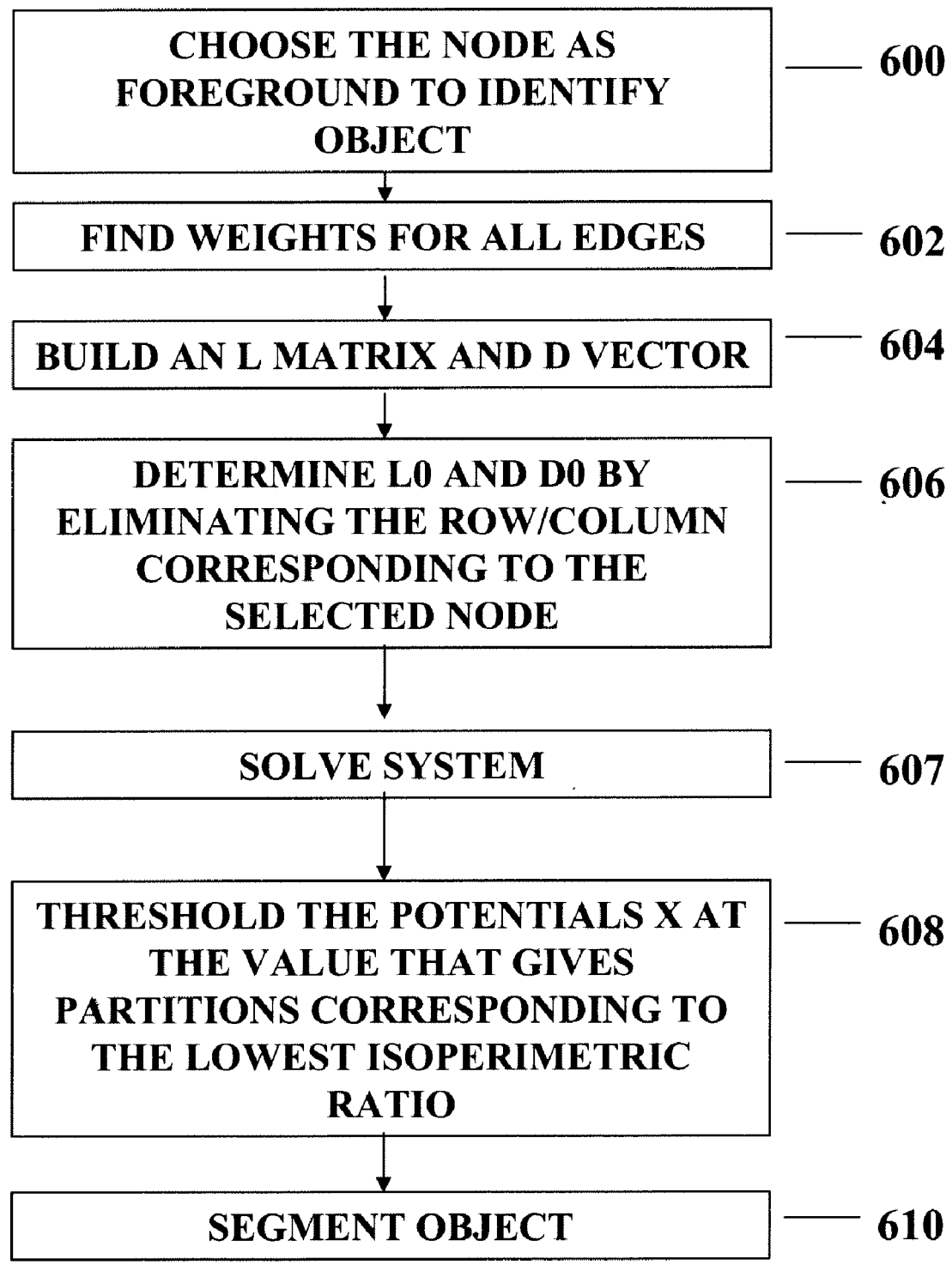
FIG. 16 illustrates additional steps in a process for isoperimetric segmentation.

The process of the present invention in accordance with a preferred embodiment is illustrated in FIG. 16. In step 600, one pixel in an object to be segmented is selected as a foreground node, such as f in FIG. 15. According to an aspect of the present invention that pixel represents a point inside the Left Ventricle that was identified in an earlier step of the description of the present invention. In step 602, find weights for all edges using (Eq 18a). In step 604 build an L matrix and a d vector. In step 606 determine $L_0$ and $d_0$ by eliminating the row/column corresponding to the selected one or more pixels. In step 607, the system is solved. In step 608, solve (13a) for $x_0$ and threshold the potentials x at the value that gives partitions corresponding to the lowest isoperimetric ratio. In step 610, the object (or partition) is segmented. Then further image processing can be performed on the segmented object or on the new image.

In order to apply the isoperimetric algorithm to partition a graph, the image values can be encoded on the graph via edge weights. The preferred edge weights depend on the image being processed. The following standard weighting function is preferred for most situations, although others can be used.

$$w_{ij} = \exp(-\beta(I_i - I_j)^2) \qquad \text{Eq 18a}$$

where $\beta$ represents a free parameter and I indicates the intensity value at node v. Note that $(I_i - I_j)^2$ may be replaced by the squared norm of a Euclidean distance in the case of vector valued data. In order to make one choice of $\beta$ applicable to a wide range of data sets, it is helpful to normalize the intensity differences for an image before applying Eq. 18a. Other weighting coefficients can be used.

Partitions must be selected from the solution. This is preferably accomplished as follows: The binary definition of x was extended to the real numbers in order to solve Eq. 13a. Therefore, in order to convert the solution, x, to a partition, a subsequent step must be applied (as with spectral partitioning). Conversion of a potential vector to a partition may be accomplished using a threshold. A cut value is a value, a, such that $S = \{v_i | x_i \leq \alpha\}$ and $\bar{S} = \{v_i | x_i > \alpha\}$. The partitioning of S and $\bar{S}$ in this way may be referred to as a cut. This thresholding operation creates a partition from the potential vector, x. Note that since a connected graph corresponds to an $L_0$ that is an M-matrix, and is therefore monotone, $L_0^{-1} \leq 0$. This result then implies that $x_0 = L_0^{-1} d_0 \geq 0$.

Solving the System of Equations. Solving Eq. 13a is the computational core of the process. It requires the solution to a large, sparse system of symmetric equations where the number of nonzero entries in L will equal 2m.

The following code in a graphics processing unit is preferred to implement the thresholding step together with the calculation of the isoperimetric ratio.

```
float4 psIsoRatio(PosTex5 v) : COLOR
{
    // sample solution, y-component is X
    float center = tex2D(sam0, v.TexCoordsC).y;
    float4 neighbors;
    neighbors.x = tex2D(sam0, v.TexCoordsU).y;
    neighbors.y = tex2D(sam0, v.TexCoordsL).y;
    neighbors.z = tex2D(sam0, v.TexCoordsR).y;
    neighbors.w = tex2D(sam0, v.TexCoordsD).y;
    // sample L matrix
    float4 L = tex2D(sam1, v.TexCoordsC);
    // test solution values against testthreshold
    float2 node = step(testthreshold.xy, center);
    float4 tn0 = step(testthreshold.x, neighbors);
    float4 tn1 = step(testthreshold.y, neighbors);
    float2 edgecut;
    edgecut.x = node.x * dot(L, 1-tn0);
    edgecut.y = node.y * dot(L, 1-tn1);
    // output 1 if pixel is in segmentation
    node = 1 - node;
    return float4(edgecut.x, node.x, edgecut.y, node.y);
}
```

A difference is that the isoperimetric method requires the solution to a sparse linear system rather than the solution to the eigenvector problem required by spectral methods of image segmentation.

Methods of image segmentation. It is not clear, a priori, how to impose a graph structure on an image. Since pixels define the discrete input, a simple choice for nodes is the pixels themselves. Traditional neighborhood connectivity employs a 4-connected or 8-connected topology. Another approach, taken by Shi and Malik, is to use a fully connected neighborhood within a parameterized radius of each node. We chose to use a minimal 4-connected topology since the matrix L becomes less sparse as more edges are added to the graph, and a graph with more edges requires more time to solve Eq. 13a. Edge weights were generated from intensity values in the case of a grayscale image or from RGB color values in the case of a color image.

The isoperimetric algorithm is controlled by only two parameters: the parameter $\beta$ of Eq 18a and the stop parameter used to end the recursion. The first parameter affects how sensitive the algorithm is to changes in feature space (e.g., RGB, intensity), while the stop parameter determines the maximum acceptable isoperimetric ratio a partition must generate in order to accept it and continue the recursion.

The following references are incorporated herein by reference: [1] M. Cerqueira et al., "Standardized myocardial segmentation and nomenclature for tomographic imaging of the heart", Circulation, 105539-542, 2002; [2] L. Grady, "Isoperimetric trees for image segmentation," Patent filing 2004P16172US, 2004; [3] L. Grady, "Space-variant computer vision: a graph-theoretic approach," PhD dissertation, Boston University, 2004; [4] C. Jackson, M. Robson, J. Francis, J. A. Noble, "Automatic Planning of the Acquisition of Cardiac MR Images", MICCAI, September 2003, pp 541-

548; [5] M.-P. Jolly, "Combining edge, region, and shape information to segment the left ventricle in cardiac MR images", MICCAI, September 2001, pp 482-490; [6] B. Lelieveldt, R. van der Geest, H. Lamb, H. Kayser, and J. Reiber, "Automated observer-independent acquisition of cardiac short-axis MR images: a pilot study", Radiology, 221(2), pp 537-542, 2001; [7] T. O'Donnell and B. Cowen, "Automatic Optimal View Determination for Cardiac Acquisitions", Patent filing 2003P07843 US01 (8706-700), 23 May 2003.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A method for processing a set of medical image data to view a heart, comprising:
    automatically obtaining a segmentation of a left ventricle of the heart from a set of volumetric image data by evaluating an isoperimetric ratio of a family of segmentations of the left ventricle;
    determining a directional relationship between the left ventricle and a right ventricle; and
    defining a plurality of cardiac planes based on the segmented left ventricle.

2. The method as claimed in claim 1, wherein the step of defining a plurality of cardiac planes depends on one or more characteristic points in the segmented left ventricle, including an apex of the left ventricle, a base of the left ventricle and a center of the left ventricle.

3. The method as claimed in claim 2, wherein a center of the right ventricle is derived from the characteristic points of the left ventricle.

4. The method as claimed in claim 3, wherein the plurality of cardiac planes is defined by a plurality of axes having:
    a first axis, the long axis, determined by the apex of the left ventricle and the base of the left ventricle;
    a second axis, perpendicular to the first axis and determined by the center of the left ventricle on the first axis and the center of the right ventricle; and
    a third axis determined as the cross product of the first and the second axis.

5. The method of claim 1, comprising processing the set of medical image data to view the heart.

6. The method of claim 5, wherein the processing includes changing a viewing orientation of the set of medical image data.

7. The method of claim 1, wherein the step of automatically detecting the left ventricle further includes:
    downsampling the set of medical image data;
    finding a pixel inside a left ventricle of the heart; and
    determining a threshold to determine a plurality of possible segmentations.

8. The method of claim 7, wherein evaluating of the isoperimetric ratio includes determining a minimum ratio of a perimeter to an area of each of the plurality of possible segmentations.

9. The method of claim 7, wherein evaluating of the isoperimetric ratio includes determining a minimum ratio of a perimeter to a volume of each of the plurality of possible segmentations.

10. The method of claim 7, further comprising iteratively evaluating the isoperimetric ratio to segment pieces of the heart and pieces connected to the heart.

11. The method of claim 7, further comprising iteratively evaluating the isoperimetric ratio until a process attempts to segment the left ventricle in half.

12. A system for processing a set of medical image data to view a heart, comprising:
    a computer;
    a software application operable on the computer to:
    automatically obtain a segmentation of a left ventricle of the heart from a set of volumetric image data by evaluating an isoperimetric ratio of a family of segmentations of the left ventricle;
    determine a directional relationship between the left ventricle and a right ventricle; and
    define a plurality of cardiac planes based on the segmented left ventricle.

13. The system as claimed in claim 12, wherein the software application is operable to define a plurality of cardiac planes depends on one or more characteristic points in the segmented left ventricle, including an apex of the left ventricle, a base of the left ventricle and a center of the left ventricle.

14. The system as claimed in claim 13, wherein a center of the right ventricle is derived from the characteristic points of the left ventricle.

15. The system as claimed in claim 14, wherein the application software defines the plurality of cardiac planes by a plurality of axes having:
    a first axis, the long axis, determined by the apex of the left ventricle and the base of the left ventricle;
    a second axis, perpendicular to the first axis and determined by the center of the left ventricle on the first axis and the center of the right ventricle; and
    a third axis determined as the cross product of the first and the second axis.

16. The system of claim 12, wherein the application software is operable to further process the set of medical image data to view the heart.

17. The system of claim 12, wherein the application software is operable to automatically detect the left ventricle by including the steps of:
    downsampling the set of medical image data;
    finding a pixel inside a left ventricle of the heart; and
    determining a threshold.

18. The system of claim 17, wherein evaluating of the isoperimetric ratio includes determining a minimum ratio of a perimeter to an area of each of the plurality of possible segmentations.

19. The system of claim 17, wherein evaluating of the isoperimetric ratio includes determining a minimum ratio of a perimeter to a volume of each of the plurality of possible segmentations.

20. The system of claim 17, wherein the application software is further capable of iteratively evaluating the isoperimetric ratio to segment pieces of the heart and pieces connected to the heart.

21. The system of claim 20, wherein the application software is further capable of iteratively evaluating the isoperimetric ratio until a process attempts to segment the left ventricle in half.

* * * * *